(12) United States Patent
Ijames

(10) Patent No.: US 6,394,254 B1
(45) Date of Patent: May 28, 2002

(54) CLUTCH WITH HIGH LEVER RATIO

(75) Inventor: Carl E. Ijames, Cuba, MO (US)

(73) Assignee: Ace Manufacturing & Parts Company, Sullivan, MO (US)

( * ) Notice: Subject to any disclaimer, the term of this patent is extended or adjusted under 35 U.S.C. 154(b) by 0 days.

(21) Appl. No.: 09/651,649

(22) Filed: Aug. 30, 2000

(51) Int. Cl.[7] .............................................. F16D 13/50
(52) U.S. Cl. .................................. 192/99 A; 192/70.29
(58) Field of Search ........................... 192/70.25, 70.27, 192/70.29, 70.3, 89 B, 98, 99 A, 111 A

(56) References Cited

U.S. PATENT DOCUMENTS

| | | |
|---|---|---|
| 4,034,836 A | 7/1977 | Sink et al. |
| 4,157,749 A | 6/1979 | Sink et al. |
| 4,662,498 A | 5/1987 | Yanko |
| 4,720,002 A | 1/1988 | Kitano et al. |
| 4,760,906 A | 8/1988 | Flotow et al. |
| 4,793,456 A | 12/1988 | Kummer et al. |
| 4,848,550 A | 7/1989 | Kitano et al. |
| 4,890,708 A | 1/1990 | Kitano et al. |
| 4,895,235 A * | 1/1990 | Nishimura et al. ........ 192/70.3 |
| 5,029,687 A | 7/1991 | Asada et al. |
| 5,067,602 A | 11/1991 | Flotow et al. |
| 5,373,927 A | 12/1994 | Gochenour et al. |
| 5,593,015 A | 1/1997 | Kosumi et al. |

OTHER PUBLICATIONS

Drawing—Automotive clutch 14 DP8 Release Lever, 1985.

* cited by examiner

Primary Examiner—Saúl Rodriguez
(74) Attorney, Agent, or Firm—Senniger, Powers, Leavitt & Roedel

(57) ABSTRACT

A friction clutch for connecting driving and driven shafts. The clutch includes a pressure plate adapted for operative attachment to the driven shaft for rotation therewith and for selectively clamping a friction disk in engagement against a flywheel of the driving shaft. An axially moveable retainer is operatively connected to a foot pedal and to the pressure plate by levers. At least one spring urges the retainer to move the pressure plate to the engaged position. Each lever has a pivot fulcrum, a first bearing surface engaging the retainer and a second bearing surface engaging a face on the pressure plate. The pivot fulcrum, first bearing surface, and second bearing surface are formed into the lever and arranged relative to each other such that a lever ratio of a first distance from the pivot fulcrum to the first bearing surface to a second distance from the pivot fulcrum to the second bearing surface is at least about 7.5 for augmenting an axial force applied by the spring to urge the pressure plate toward the engaged position.

8 Claims, 3 Drawing Sheets

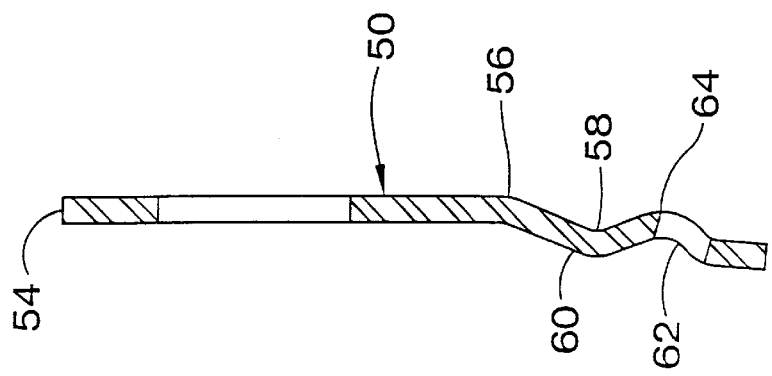
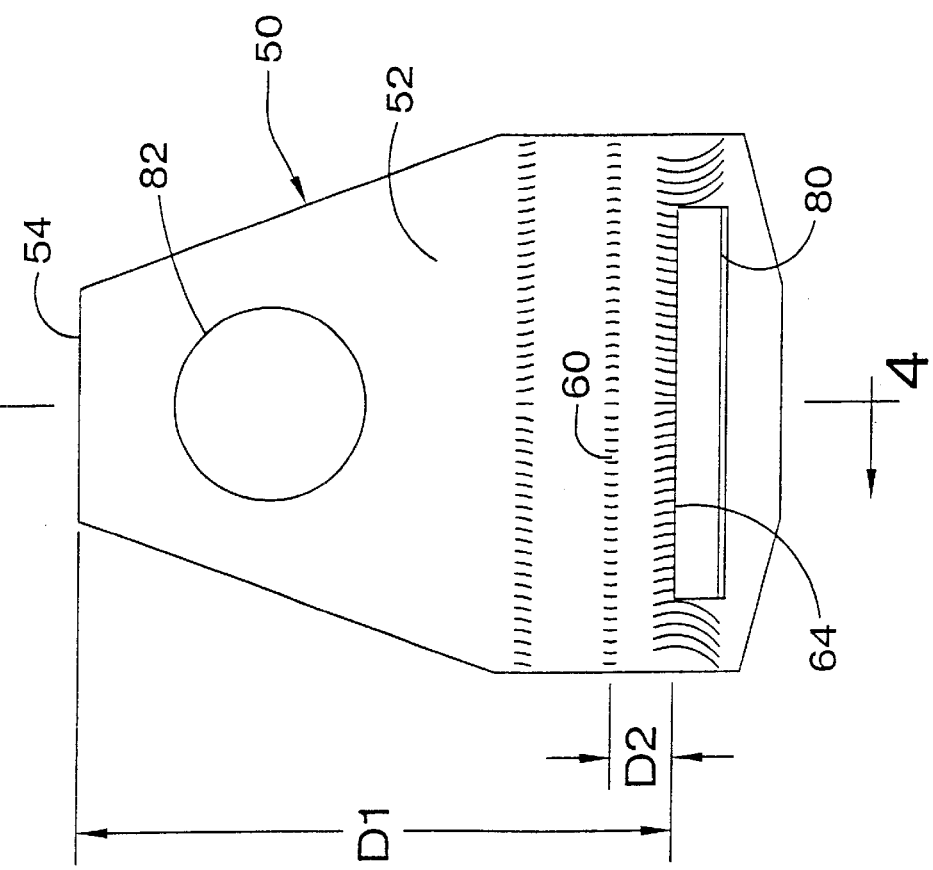

CLUTCH WITH HIGH LEVER RATIO

BACKGROUND OF THE INVENTION

This invention relates generally to friction clutches, and in particular to a clutch for transmitting increased power without any corresponding increase in size or weight.

Friction clutches are widely used in trucks and other automotive vehicles to selectively connect a driving shaft which is a source of rotational power, such as an engine crankshaft, to a driven shaft, such as a transmission input shaft. A typical clutch has a moveable pressure plate connected for rotation with the driving shaft and a friction disk connected for rotation with the driven shaft. When the pressure plate is moved to a position where it clamps the friction disk in engagement against a flywheel on the end of the driving shaft, the driven shaft rotates with the flywheel and torque is transmitted from the driving shaft to the driven shaft. When the pressure plate is moved to a position where the friction disk is disengaged from the flywheel, no torque is transmitted and a driver of the vehicle is free to shift gears of the transmission.

A release assembly is typically provided for moving the pressure plate into and out of position where the friction disk engages the flywheel. The release assembly includes a sleeve-shaped retainer hub which is moveable to actuate motion of the pressure plate. One or more levers are pivotally disposed between the retainer and the pressure plate, linking them together such that movement of the retainer causes a corresponding movement of the pressure plate. Compression springs are included which urge the retainer toward a position where the pressure plate clamps the friction disk against the flywheel, and which hold the pressure plate in its engaged position. The levers provide a mechanical advantage in that force applied by the springs is transmitted through the levers and its magnitude is multiplied by a lever ratio. Therefore, the force of the pressure plate against the flywheel, known as the plate load, is larger than the spring force. The release assembly also includes a foot pedal in the vehicle that is operatively connected to the retainer. When the driver of the vehicle presses upon the foot pedal, he or she opposes and overcomes the spring force in moving the retainer to a position where the friction disk disengages from the flywheel. The driver is then free to shift gears of the transmission. On subsequent release of the foot pedal, the spring force on the retainer and, through the levers, on the pressure plate, returns the retainer and pressure plate to their original positions wherein the friction disk engages the flywheel.

Recent trucks and other automotive vehicles include an engine of significantly greater horsepower and torque that requires a clutch which transmits more power. That clutch must provide a correspondingly greater plate load to hold its pressure plate in position to avoid slipping. To facilitate a larger plate load, some clutches include springs of increased number, size, or a different type which apply a larger force upon the retainer and thereby upon the pressure plate. Unfortunately, these springs detrimentally increase weight and volume of the clutch. Further, since the driver must oppose a larger spring force when pressing upon the foot pedal, the clutch is more difficult to operate. These clutches are complex, increase cost, and reduce reliability of the clutch.

SUMMARY OF THE INVENTION

Among the several objects and features of the present invention may be noted the provision of a clutch suitable for use in vehicles with higher torque engines; the provision of such a clutch that transmits larger forces without increasing size or weight of the clutch; the provision of such a clutch that minimizes force that must be applied to disengage the clutch; the provision of such a clutch which is reliable; and the provision of such a clutch that is economical.

A friction clutch of the present invention connects driving and driven shafts. In general, the clutch comprises a pressure plate adapted for operative attachment to the driven shaft for rotation therewith. The pressure plate is axially moveable between an engaged position wherein the pressure plate clamps a friction disk of the driven shaft in engagement against a flywheel of the driving shaft thereby to transmit torque from the driving shaft to the driven shaft and a disengaged position wherein the pressure plate does not clamp the friction disk and no torque is transmitted. A retainer is axially moveable and capable of operative connection to a foot pedal for selectively applying force to the retainer for axial movement thereof. A cover is adapted for mounting on the flywheel in stationary axial position relative to the flywheel. The cover includes an adjusting ring which is adjustably moveable in axial position. At least one spring is interposed between the cover and the retainer for urging the retainer to an axial location wherein the pressure plate is in the engaged position. The clutch includes at least one lever for actuating the axial movement of the pressure plate in response to axial movement of the retainer. The lever has a pivot fulcrum engaging the adjusting ring, a first bearing surface engaging the retainer for axial movement therewith and a second bearing surface engaging a face on the pressure plate for axially moving the pressure plate. The pivot fulcrum, first bearing surface, and second bearing surface are formed into the lever and arranged relative to each other such that a lever ratio of a first distance from the pivot fulcrum to the first bearing surface to a second distance from the pivot fulcrum to the second bearing surface is at least about 7.5 for augmenting an axial force applied by the spring to urge the pressure plate toward the engaged position.

In another aspect, a lever of the present invention is for inclusion in a friction clutch. The lever is configured to actuate axial movement of a pressure plate adapted for selectively clamping a friction disk against a flywheel of a driving shaft. The pressure plate is moveable between an engaged position wherein the friction disk engages the flywheel thereby to transmit torque from the driving shaft to the driven shaft and a disengaged position wherein the friction disk is disengaged from the flywheel and no torque is transmitted. The lever is configured for being pivotally disposed to transmit motion and force between an axially moveable retainer and the pressure plate. The lever comprises a onepiece plate formed to have a pivot fulcrum for engaging an adjusting ring of a clutch cover, a first bearing surface for engaging the retainer, and a second bearing surface for engaging the pressure plate. The pivot fulcrum is located a distance D1 from the first bearing surface. The pivot fulcrum and second bearing surface are constructed and arranged relative to each other so that the distance separating the pivot fulcrum from the second bearing surface is less than or equal to D1/7.5.

Other objects and features of the present invention will be in part apparent and in part pointed out hereinafter.

BRIEF DESCRIPTION OF THE DRAWINGS

FIG. 3 is an enlarged plan view of a lever; and

FIG. 4 is a sectional view of the lever taken along line 4—4 of FIG. 3.

Corresponding reference characters indicate corresponding parts throughout the views of the drawings.

DETAILED DESCRIPTION OF THE PREFERRED EMBODIMENT

Figure 1:
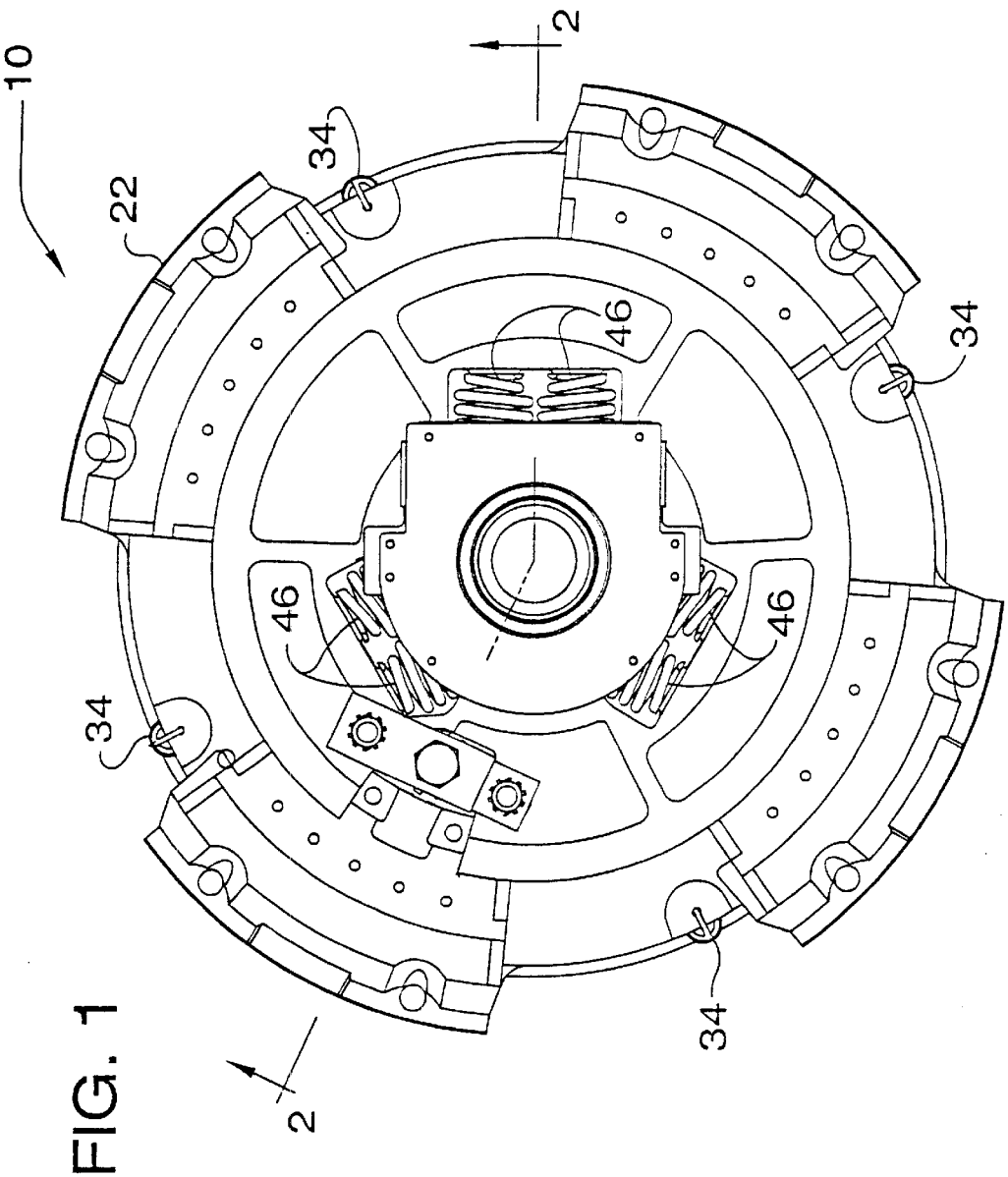
FIG. 1 is a rear elevation of a friction clutch according to the present invention.
Figure 2:
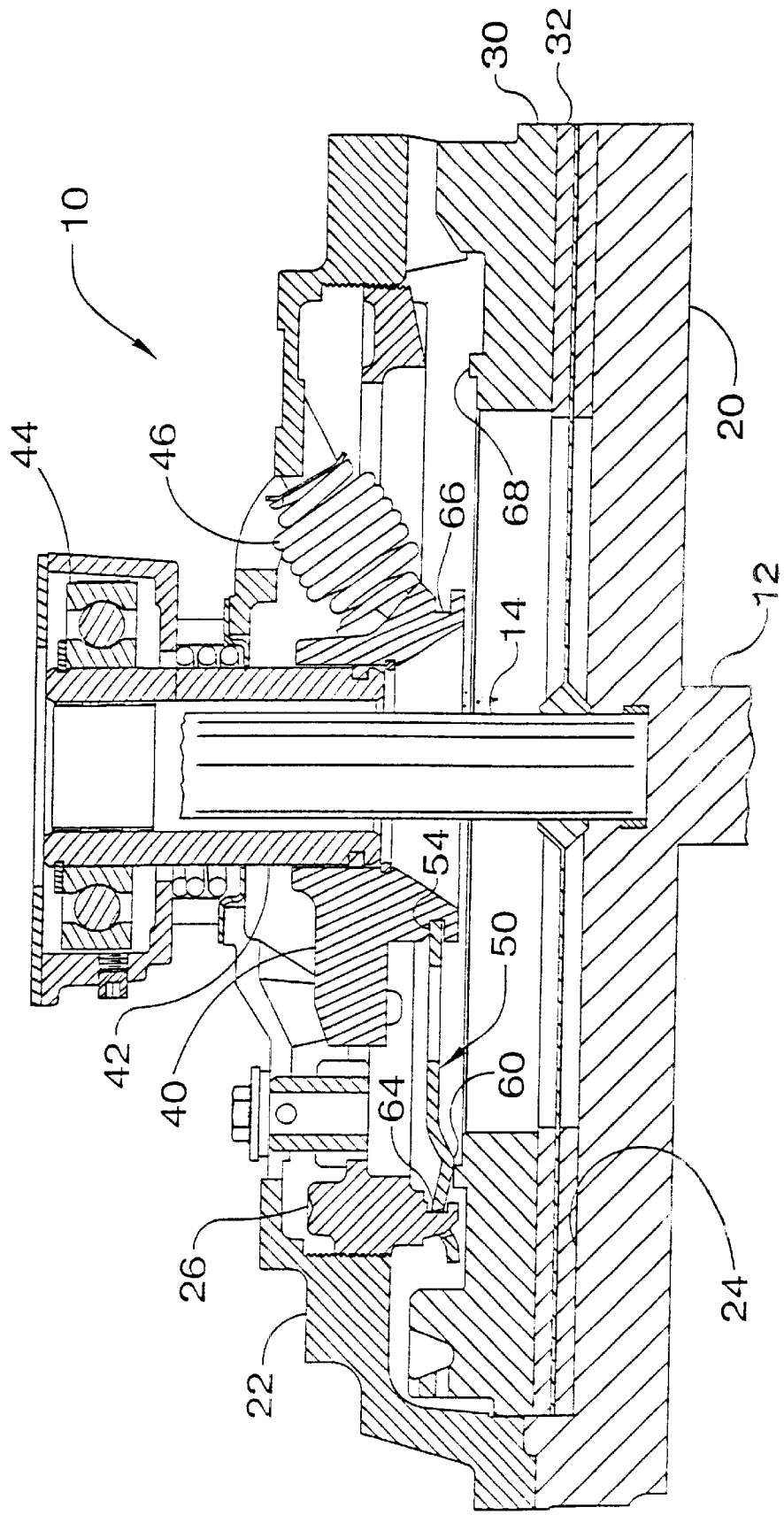
FIG. 2 is a sectional elevation taken along line 2—2 of FIG. 1.

Referring now to the drawings and in particular to FIGS. 1 and 2, a friction clutch of the present invention is indicated generally at 10. The clutch 10 interconnects a powered, driving shaft 12 to a driven shaft 14. Typically the driving shaft 12 is an engine crankshaft of an automotive vehicle which is attached to a flywheel 20, and the driven shaft 14 is a transmission gearbox input shaft. The driving shaft 12 and driven shaft 14 are axially aligned and can be operatively connected through the clutch 10 so that torque is transmitted and the shafts rotate together. A driver of the vehicle uses the clutch 10 to selectively disconnect the shafts, interrupting the transmission of torque, in order to permit a gear shifting operation in the transmission.

The clutch 10 includes a bowl-shaped cover 22 which is attached to the driving shaft 12 and which rotates with the driving shaft. The flywheel 20 rotates with the engine crankshaft and functions as a balancer for the engine, dampening vibrations and adding inertia to the crankshaft. It also provides a machined surface 24 for contact with the clutch to transmit torque to the transmission. The cover 22 generally houses a clutch assembly and is mounted in stationary axial position relative to the flywheel 20. The cover 22 includes an adjusting ring 26 which is threadably adjustable relative to the flywheel 20 in an axial direction when needed as the clutch receives wear. The ring 26 may be self-adjusting, as is known.

A pressure plate 30 is adapted for selectively clamping at least one friction disk 32 in engagement against the flywheel 20. The friction disk 32 is disposed between the pressure plate 30 and the flywheel 20 for use in interconnecting the driven shaft 14 and flywheel for conjoint rotation. The pressure plate 30 has an annular shape and is axially moveable between an engaged position (FIG. 2) wherein the pressure plate operatively engages the flywheel 20 by way of the friction disk 32 thereby to transmit torque from the h driving shaft to the driven shaft and a disengaged position (not shown) wherein the friction disk is disengaged from the flywheel and substantially no torque is transmitted. In the engaged position the pressure plate 30 clamps the friction disk 32 against the flywheel 20. In the disengaged position, a plurality of circumferentially spaced return springs 34 (FIG. 1) withdraw the pressure plate 30 to the disengaged position.

The clutch 10 includes a retainer 40 that is axially moveable to actuate motion of the pressure plate 30. The retainer 40 is shaped in the form of a sleeve and slidably mounted on a hub 42 around the driven shaft 14. The retainer 40 is operatively connected to a foot pedal (not shown) through a release bearing 44 and related linkage for selectively applying force to the retainer for axial sliding movement. At least one spring, and preferably six coil-type springs 46 as shown in FIG. 1, are interposed between the cover 22 and the retainer 40 for urging the retainer to an axial location wherein the pressure plate 30 is in the engaged position.

At least one lever indicated generally at 50 extends from the retainer 40 in a generally radially outward direction for actuating the axial movement of the pressure plate 30 in response to axial movement of the retainer 40. The levers 50 are configured for being pivotally disposed to transmit motion and force from the retainer 40 to the pressure plate 30. Preferably, there are six levers 50 circumferentially spaced about the clutch 10. The levers 50 provide a mechanical advantage augmenting the axial force applied by the springs 46 for corresponding axial force application on the pressure plate 30 to urge the pressure plate toward the engaged position. As shown in FIG. 2, each lever 50 extends from the retainer 40 to beyond the adjusting ring 26.

Referring now to FIGS. 3 and 4, each lever 50 comprises a bent, tapered plate of uniform thickness material which is preferably one-piece in construction. The lever 50 has a generally flat portion 52 including a first bearing surface 54, a first bend 56 disposed at an end of the flat portion opposite the first bearing surface, a second bend 58 at a second bearing surface 60 and a third bend 62 at a pivot fulcrum 64. Positions of the bends and surfaces are selected so that the lever functions across a range of angular positions in the limited internal space of the clutch. A distance between the first bend 56 and the second bend 58 is greater than the distance between the second bend and the third bend 62. The first bearing surface 54 is located along an edge of the lever 50 that is positioned radially inboard when installed in the clutch 10. The first bearing surface 54 is configured to engage the retainer 40 in a circumferential groove 66 in the retainer so that it moves along with axial motion of the retainer, with no need for fasteners connecting the lever to the retainer. The second bearing surface 60 engages an annular face 68 on the pressure plate 30 (FIG. 2) to axially move the pressure plate. The second bearing surface 60 is located along the second bend 58, extending across a full width of the lever and having a radiused contour suitable for engaging the pressure plate.

The lever 50 has a rectangular-shaped hole 80 therethrough for mounting the lever on the adjusting ring 26 of the cover 22. An edge of the rectangular hole 80 comprises the fulcrum 64 for engaging the adjusting ring and enabling pivotal motion of the lever. The pivot fulcrum 64 is held generally stationary in the axial direction by the adjusting ring 26 and cover 22. The lever also has a circular hole 82 positioned in the flat portion 52. The circular hole 82 permits the lever to be more lightweight in construction and permits better air ventilation through the clutch for cooling purposes.

The pivot fulcrum 64, first bearing surface 54, and second bearing surface 60 are formed into the lever 50 and arranged relative to each other to provide a lever ratio is at least about 7.5, and more preferably about 8.4. The lever ratio is defined as a ratio between a first distance D1 from the pivot fulcrum 64 to the first bearing surface 54 to a second distance D2 from the pivot fulcrum to the second bearing surface 60. As conventional for operation of a lever, axial force applied on the retainer 40 is multiplied by the lever ratio for corresponding magnitude applied on the pressure plate 30. Axial translation of the retainer 40 is reduced in magnitude for corresponding axial translation of the pressure plate by dividing by the lever ratio. Although the clutch 10 of the preferred embodiment has a lever ratio of about 8.4, it is understood that any lever ratio greater than 7.5, including up to 9.5 and above, does not depart from the scope of the present invention.

To accomplish the increased lever ratio, the lever 50 must be formed so that the second distance D2 is very small because the clutch has tight physical constraints and limited internal volume. That requires that the bends and shape of the lever 50 be carefully positioned to fit within the limited space constraints permitted by the surrounding parts of the clutch 10. For a typical automotive clutch of the preferred embodiment, the second distance D2 is preferably less than about 0.50 inches, and more preferably about 0.37 inches, which is substantially smaller than on clutches of the prior art. In the illustrated embodiment, the first distance D1 is about 3.11 inches. In practice, the second distance D2 has been as low as 0.29 inches. However, the distance will vary with the size of the engine and the clutch required. The face 68 on the pressure plate 30 that is engaged by the second bearing surface 60 is positioned further outboard than on clutches of a lower lever ratio.

In operation, when the driver applies force to the foot pedal to disengage the clutch 10, the retainer 40 is moved axially in the direction away from the flywheel 20. The movement of retainer 40 compresses the springs 46 and thus is opposed by force of the springs. The first bearing surface 54 of each lever 50 is engaged in circumferential groove 66 of the retainer 40 and travels with the retainer, causing the lever 50 to undergo pivotal motion. Each lever 50 rotates with a center of rotation at the pivot fulcrum 64, where the lever engages the adjusting ring 26. As each lever pivots, the second bearing surface 60 moves axially in the direction away from the flywheel 20.

When the operator releases the foot pedal, the springs 46 return the retainer 40 to a position where the pressure plate 30 clamps the friction disk 32 against the flywheel 20. Axial translation of the second bearing surface 60 is directly proportional to its radial distance D2 from the pivot fulcrum 64. The pressure plate 30, which engages the second bearing surface 60 at face 68, moves axially a distance equal to the translation of the second bearing surface. Transmission of axial forces through each lever 50 is related to relative locations of the bearing surfaces. As conventional for a lever, the product of the axial force on the first bearing surface 54 and the distance D1 must equal the product of the axial force on the second bearing surface 60 and the distance D2. Because the lever of the present invention is configured so that D2 is relatively smaller, the axial force transmitted to the pressure plate is relatively larger. The axial force applied on the retainer 40 by the springs 46 is multiplied by the lever ratio for corresponding application on the pressure plate. The bends 56, 58, 62 of the lever are shaped and the second bearing surface 60 positioned to permit the lever to freely move and function in the limited internal space of the clutch 10 while gaining the benefits of a higher lever ratio.

In practice, the clutch 10 of the present invention has demonstrated significantly higher plate loads with no increase in the size of the springs 46. Thus the clutch permits transmission of larger torque than prior clutches without any corresponding increase in weight, nor any increase in the force needed to disengage the clutch. In lieu of transmission of a larger torque, the clutch 10 may transmit an equivalent torque with smaller, lighter springs 46 and a decreased force needed to disengage the clutch. For that embodiment, the magnitude of axial force that must be applied by the springs 46 to hold the pressure plate 30 in the engaged position is reduced, permitting reduction of a magnitude of axial force that must be applied through the foot pedal to move the pressure plate to the disengaged position.

In view of the above, it will be seen that the several objects of the invention are achieved and other advantageous results obtained.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

What is claimed is:

1. A friction clutch for connecting driving and driven shafts, comprising:

a pressure plate adapted for operative attachment to said driven shaft for rotation therewith, the pressure plate being axially moveable between an engaged position wherein the pressure plate clamps a friction disk of said driven shaft in engagement against a flywheel of said driving shaft thereby to transmit torque from the driving shaft to the driven shaft and a disengaged position wherein the pressure plate does not clamp said friction disk and no torque is transmitted;

a retainer that is axially moveable, the retainer being capable of operative connection to a foot pedal for selectively applying force to the retainer for axial movement thereof;

a cover adapted for mounting on the flywheel in stationary axial position relative to the flywheel, the cover including an adjusting ring which is adjustably moveable in axial position;

at least one spring interposed between the cover and the retainer for urging the retainer to an axial location wherein the pressure plate is in the engaged position; and at least one lever for actuating said axial movement of the pressure plate in response to axial movement of the retainer, the lever having a pivot fulcrum engaging the adjusting ring, a first bearing surface engaging the retainer for axial movement therewith and a second bearing surface engaging a face on the pressure plate for axially moving the pressure plate, and wherein the pivot fulcrum, first bearing surface, and second bearing surface are formed into the lever and arranged relative to each other such that a lever ratio of a first distance from the pivot fulcrum to the first bearing surface to a second distance from the pivot fulcrum to the second bearing surface is at least about 7.5 for augmenting an axial force applied by the spring to urge the pressure plate toward the engaged position.

2. A friction clutch as set forth in claim 1 wherein the pivot fulcrum, first bearing surface, and second bearing surface are arranged to have a lever ratio of about 8.4.

3. A friction clutch as set forth in claim 1 wherein said second distance between the pivot fulcrum and the second bearing surface is less than about 0.5 inches.

4. A friction clutch as set forth in claim 3 wherein said second distance between the pivot fulcrum and the second bearing surface is about 0.37 inches.

5. A friction clutch as set forth in claim 1 wherein the lever comprises a generally flat portion including the first bearing surface, a first bend disposed at an end of the flat portion opposite the first bearing surface, a second bend at the second bearing surface where the second bearing surface engages the pressure plate and a third bend at the pivot fulcrum where the pivot fulcrum engages the cover, the distance between the first bend and the second bend being greater than the distance between the second bend and the third bend.

6. A friction clutch as set forth in claim 1 in combination with said friction disk.

7. A lever for inclusion in a friction clutch, the lever configured to actuate axial movement of a pressure plate adapted for selectively clamping a friction disk against a flywheel of a driving shaft, the pressure plate being moveable between an engaged position wherein the friction disk engages the flywheel thereby to transmit torque from the driving shaft to the driven shaft and a disengaged position wherein the friction disk is disengaged from the flywheel and no torque is transmitted, the lever configured for being pivotally disposed to transmit motion and force between an axially moveable retainer and the pressure plate, the lever comprising:

a one-piece plate formed to have a pivot fulcrum for engaging an adjusting ring of a clutch cover, a first bearing surface for engaging the retainer, and a second bearing surface for engaging the pressure plate, the pivot fulcrum being located a distance $D1$ from the first bearing surface, the pivot fulcrum and second bearing surface being constructed and arranged relative to each other so that the distance separating the pivot fulcrum from the second bearing surface is less than or equal to $D1/7.5$.

8. A lever as set forth in claim 7 wherein the plate comprises a generally flat portion including the first bearing surface, a first bend disposed at an end of the flat portion opposite the first bearing surface, a second bend at the second bearing surface where the second bearing surface engages the pressure plate and a third bend at the pivot fulcrum where the pivot fulcrum engages the cover, the distance between the first bend and the second bend being greater than the distance between the second bend and the third bend.

\* \* \* \* \*